US007009514B2

(12) United States Patent
Dupeire (10) Patent No.: US 7,009,514 B2
(45) Date of Patent: Mar. 7, 2006

(54) SELF CONTAINED POWER DISRUPTION ALERT DEVICES AND METHODS FOR GENERATING AUDIBLE ALERTS

(75) Inventor: Wesley J. Dupeire, Prairieville, LA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 69 days.

(21) Appl. No.: 10/691,207

(22) Filed: Oct. 22, 2003

(65) Prior Publication Data

US 2005/0093708 A1    May 5, 2005

(51) Int. Cl.
*G08B 13/14* (2006.01)

(52) U.S. Cl. .................. 340/568.4; 340/635; 340/652; 340/638; 340/644; 340/656; 340/654

(58) Field of Classification Search ............. 340/568.4, 340/635, 652, 638, 644, 656, 654
See application file for complete search history.

(56) References Cited

U.S. PATENT DOCUMENTS

| 4,987,402 | A | * | 1/1991 | Nykerk ........................ 704/274 |
| 5,434,558 | A | * | 7/1995 | Zeder ........................ 340/568.3 |
| 5,463,595 | A | * | 10/1995 | Rodhall et al. ................ 367/93 |
| 5,663,711 | A | * | 9/1997 | Sanders et al. .............. 340/635 |
| 5,801,635 | A | * | 9/1998 | Price ........................... 340/656 |
| 6,229,450 | B1 | * | 5/2001 | Malmsten .................... 340/652 |
| 2002/0118498 | A1 | * | 8/2002 | Nordling ...................... 361/42 |

OTHER PUBLICATIONS

Power-Out Alert ™, "Product by Winland with Prompt Notification of Power Outages", http://www.save-on-security.com/sec4.html, 1 sheet, date unknown but prior to Jul. 30, 2003.

* cited by examiner

*Primary Examiner*—Tai T. Nguyen
(74) *Attorney, Agent, or Firm*—Myers Bigel Sibley & Sajovec PA (57) ABSTRACT

A low cost self-contained power disruption alert device is configured with a light-weight pocket and/or palm sized compact body to generate a local audible alert that is output by a speaker when power to an electrical wall outlet is disrupted.

32 Claims, 7 Drawing Sheets

SELF CONTAINED POWER DISRUPTION ALERT DEVICES AND METHODS FOR GENERATING AUDIBLE ALERTS

FIELD OF THE INVENTION

The present invention relates to power failure monitoring devices.

BACKGROUND OF THE INVENTION

Many modern homes are equipped with certain electrical outlets protected by a GFI (ground fault interruption) circuit having a circuit breaker. The GFI circuit may cover more than one electrical outlet, and the outlets can be positioned apart from each other (even in different rooms) in the home. Typically, one electrical outlet associated with the GFI circuit will include a reset switch. While a person may be able to look at the outlet with the GFI reset to determine if the breaker or fuse has tripped, it can be difficult to identify when a power interruption occurs on other outlets. Further, not all GFI outlets are readily visually accessible. This can be problematic if a device is plugged into an affected outlet so that a power interruption or failure may cause unnecessary loss of data, food, or other items.

In the past, power-out alerts have been proposed that plug into an outlet to monitor for power failure using a relatively long (15') cord that allegedly can wire into any alarm panel, telephone communicator or wireless transmitter. However, these type of hard wired devices can be relatively expensive and overly complex for many consumer applications.

In view of the foregoing, there remains a need for a power failure alert that is economic and easy to install and use.

SUMMARY

Embodiments of the present invention provide low-cost self-contained alert plug-ins that can transmit an audible alert when power to the outlet is interrupted in the event of a power disruption, failure and/or circuit breaker trip.

Certain embodiments are directed toward self-contained power disruption alert devices. The devices include: (a) a housing with a plurality of male conductors extending outwardly therefrom, the male conductors sized and configured to enter an electrical wall outlet to be in electrical communication therewith; (b) an electronic circuit held in the housing and configured to determine a power disruption in the electrical wall outlet; (c) a battery receiving space disposed on and/or in the housing and sized and configured to hold a battery to be in electrical communication with the electronic circuit to power the electronic circuit when power to the electrical wall outlet is disrupted; and (d) a speaker in communication with the electronic circuit, wherein, in operation, an audible alert is output by the speaker in response to the electronic circuit determining power to the electrical wall outlet is disrupted.

In particular embodiments, the device can be self-contained and devoid of externally extending wires. In certain embodiments, the device can include a female electrical outlet disposed on the housing, the female electrical outlet sized and configured to receive male conductors therein and electrically connect the male conductors to the wall electrical outlet. In addition, the alert device can include a timer in communication with the electronic circuit. The timer can be configured for determining the duration of the power disruption. The device can be configured to connect to a wall panel outlet having a GFI circuit or other outlet on a non-GFI circuit. The device may be a light-weight, compact single-use device that is either disposable after a single power disruption event or a compact reuseable device that can be reset or automatically operate after power is restarted.

Other embodiments are directed toward methods for generating an alert when power is disrupted to an electrical outlet. The methods can include: (a) mounting a self-contained power disruption alert device to an electrical outlet; and (b) automatically generating an audible alert when power is disrupted to the electrical outlet using the alert device.

Other systems, methods and/or computer program products according to embodiments of the present invention will be or become apparent to one of skill in the art upon review of the following drawings and detailed description. It is intended that all such additional systems, methods, and/or computer program products be within the scope of the present invention, and be protected by the accompanying claims.

DETAILED DESCRIPTION OF EMBODIMENTS OF THE INVENTION

The present invention will now be described more fully hereinafter with reference to the accompanying figures, in which preferred embodiments of the invention are shown. This invention may, however, be embodied in many different forms and should not be construed as limited to the embodiments set forth herein. Like numbers refer to like elements throughout. In the drawings, layers, regions, or components may be exaggerated for clarity. In the figures, broken lines indicate optional features unless described otherwise. The method steps are not limited to the order in which they are set forth unless so stated.

Embodiments of the present invention are directed to low-cost self-contained power disruption, interruption and/or failure alert devices suitable for use in residential homes. The devices are contemplated as courtesy alarms for non-critical needs. The devices may not be appropriate for uses involving critical needs such as those circuits that power life-saving or life-assisting devices. Critical need devices may desire additional redundant monitoring circuitry, wireless communication or remote alerts, and/or power generator back-up, and the like. However, embodiments of the present invention may be used in critical need applications, for example, as a back-up or courtesy device used in combination with other critical need power back up and/or detection devices.

Figure 1:
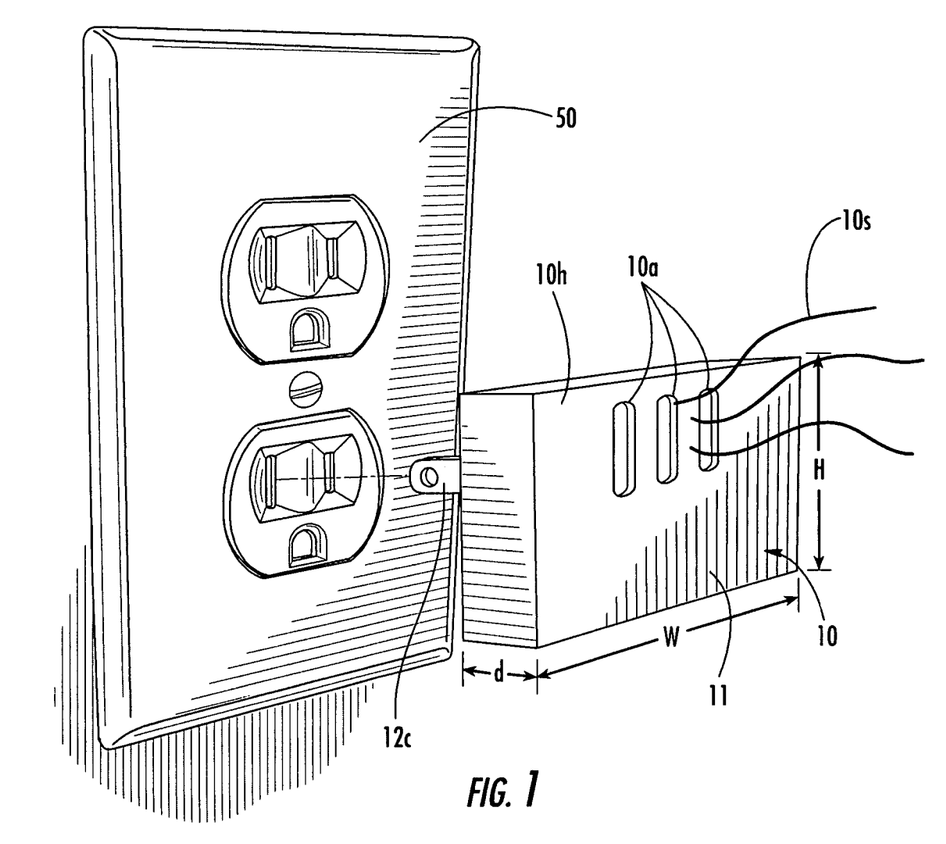
FIG. 1 is a front view of a self-contained power disruption alert device according to embodiments of the present invention.

FIG. 1 illustrates one embodiment of a power disruption alert device 10. As shown, the device 10 may include one or more apertures 10a for allowing audible alert signals 10s to be transmitted therethrough to thereby reduce any acoustic loss as the audible alert signals travel out from the device 10. A cover, such as a mesh or other lower acoustic impedance material (not shown), may be positioned over the apertures 10a. The apertures 10a may be positioned on the side of the device and/or the forward surface 11 as shown.

The housing 10h of the device 10 can be sized as a self-contained relatively small pocket or palm size device having a width "w", a height "h" and a depth "d". The term "self-contained" means that the device holds all operative components needed to generate an audible alert when power is disrupted to an electrical outlet to which the device is plugged in. As shown, the device 10 is devoid of and operates without external wiring to a remote connection. To decrease cost and/or increase ease of use, the device 10 can be configured to generate only local signals, i.e., without remote wireless or wired capability. In certain embodiments the device 10 has a front face 11 with a surface area (w×h) that is less than about 14 in$^2$. Typically, the width and height of the device 10 can be about 3 inches or less. The depth can be about 2 inches or less and more typically about 1 inch or less. The device 10 can weigh about 8 ounces or less, and more typically less than about 4 ounces (without a battery). In particular embodiments, the device 10 can weigh about 8 ounces or less with the operative battery mounted therein/thereon.

Figure 2:
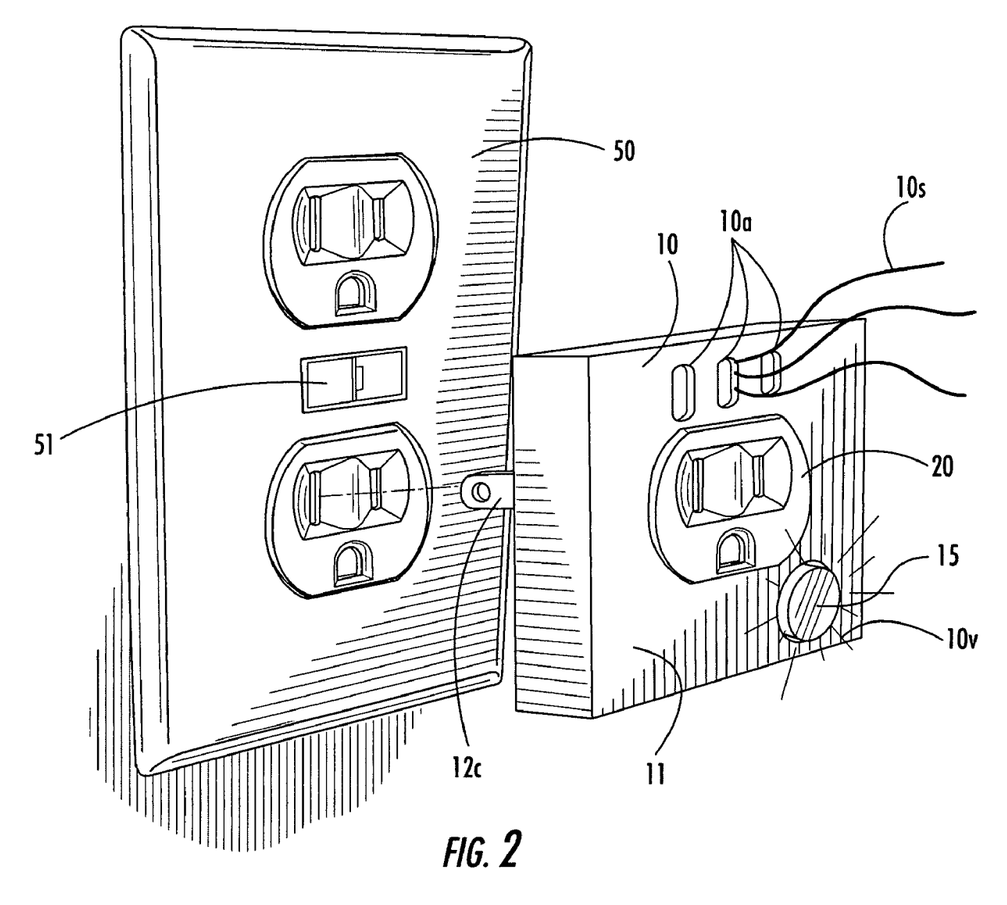
FIG. 2 is a front view of another self-contained alert device according to embodiments of the present invention.

The device 10 includes a plurality of male conductors 12c that are sized and configured to engage a selected electrical (wall) outlet 50. The device 10 may be particularly suitable for use in an electrical outlet 50 in electrical communication with a ground fault interruption (GFI) circuit. The outlet 50 may include a GFI reset 51 thereon as shown in FIG. 2. The device 10 may include a ground prong as desired (not shown). The device 10 can operate to sound an alarm on a tripped breaker or fuse whether or not the GFI itself trips. In addition, the device 10 may also be used in outlets on non-GFI circuits, including older homes or circuits that do not include the GFI circuit (where power can be disrupted by a tripped breaker, burnt fuse and the like) wherein the housing has a forward surface with a height and width defining a surface area that is less than about 14 in$^2$, wherein the housing is compactly configured with bounds thereof being substantially coextensive with a portion of an electrical socket cover plate to allow visual access to a GFI reset on the electrical socket cover plate and wherein the device has a weight that is self-supported upon plug into an electrical socket in the electrical socket cover plate.

FIG. 2 illustrates that the device 10 can also include a visual alert component 15 positioned and configured so that it the visual alert 10v output therefrom is externally viewable. Although shown as positioned on the forward surface or wall 11, the visual alert 15 can be disposed otherwise, such as for example, on a top, bottom, and/or side edge portions of the device housing 10h.

FIG. 2 also illustrates that the device 10 may also include a female electrical receptacle outlet 20 disposed on the housing 10h. The female electrical outlet 20 is sized and configured to receive male conductors therein and electrically connect the male conductors of another device to the underlying wall electrical outlet 50 with the device 10 providing the intermediate connection therebetween. This embodiment does not reduce the number of electrical plug-ins available to the user. In other embodiments, the device 10 can be configured to provide a plurality of electrical outlets (typically two) to provide additional power connections to the underlying wall outlet 50 with a power failure alert (not shown). In such an embodiment, the additional power connection can be configured so as not to block the free outlet (the outlet not used by the power alert device 10) on the electrical outlet 50.

Figure 3:
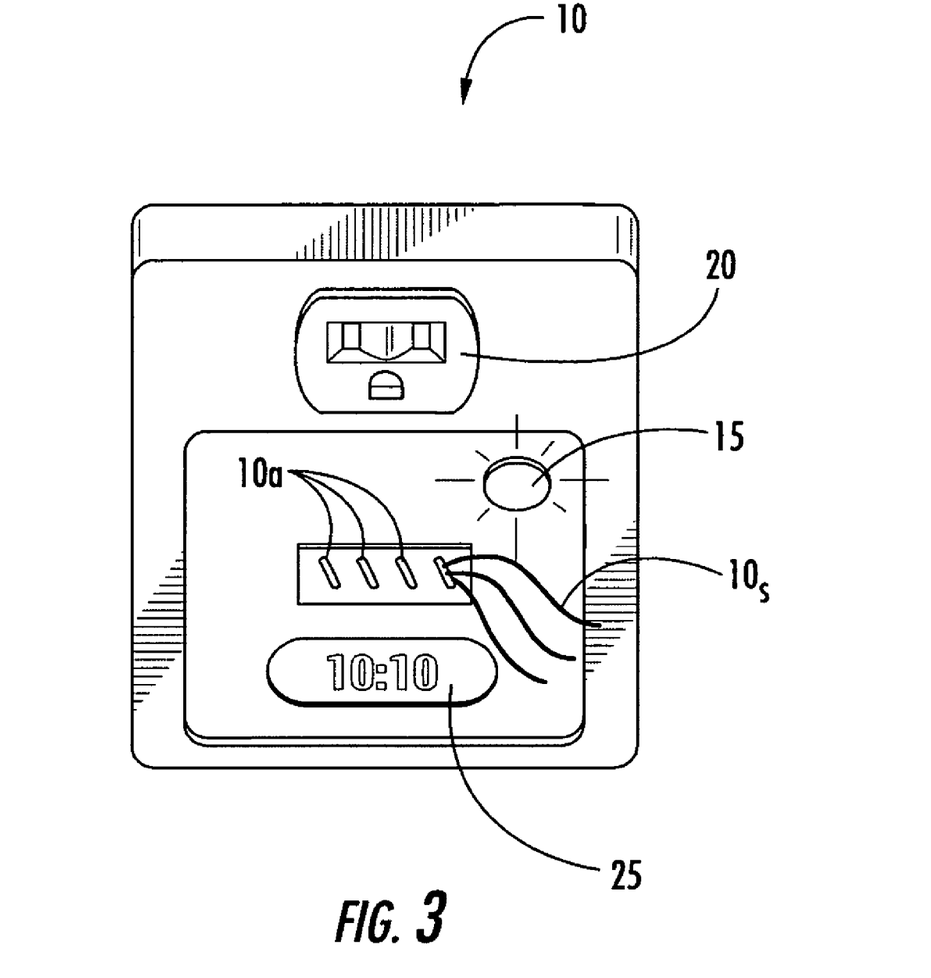
FIG. 3 is a front view of an additional self-contained power disruption alert device according to embodiments of the present invention.

FIG. 3 illustrates yet another embodiment of the device 10. In this embodiment, the device 10 includes a timer display 25 for providing the duration of the detected power disruption. The timer display 25 is in electrical communication with a timer/clock in the device 10 as will be discussed further below. The timer display 25 may be configured to display the duration of the outage in hours and minutes as shown. In other embodiments, the device 10 can display days, hours and minutes or just minutes or just hours and may not increase when the duration is longer than a certain threshold time (i.e., 12 hours). In particular embodiments, the device 10 can be configured to track and then display the calendar month and day the disruption occurred. Thus for example, the device 10 can be configured to display that on October 1, a power disruption lasting approximately 10 hours and 10 minutes was detected. This type of data may be helpful when a user is deciding whether to discard food goods in a refrigerator or freezer plugged into the electrical outlet and/or same electrical circuit.

The alert signal 10s as well as the timer may be configured to operate with a predetermined delay so that minor power disruptions, typically lasting less than about 5–10 minutes or other desired interval, do not trigger the alert(s) and/or the elapsed timer. The display 25 and/or timer may be manually reset such as with a manual externally accessible reset switch (not shown). The device 10 may include memory for storing different power outage durations occurring over a desired interval. The device 10 can include a user input button that allows a user to prompt the device 10 for the outage duration/length of each detected outage event. The visual alert 15 may be configured to present a different visual appearance when more than one event is detected and not cleared from the device's electronic memory.

Figure 4:
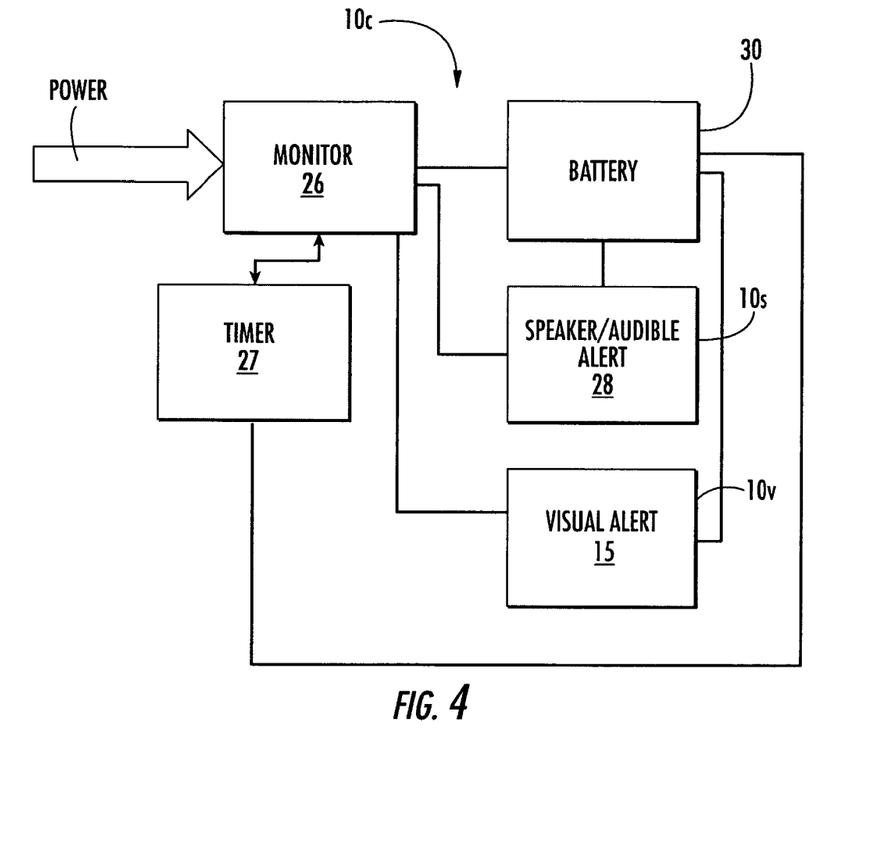
FIG. 4 is a block diagram of a power disruption alert device according to embodiments of the present invention.

FIG. 4 illustrates an example of an electronic circuit 10c that can be held in the device 10. As shown, the electronic circuit 10c can include a power monitor 26, a timer 27, a speaker 28, a battery 30, and the visual alert component 15. The power monitor 26 can be any suitable circuit and/or electric component configured to determine and/or generate the audible alert when power from the underlying electrical outlet is disrupted. The timer 27 may be configured to provide an operational delay so that the alert device 10 does not generate the audible signal 10s from the speaker 28 and/or visual signal 10v from the visual alert 15 for relatively short disruptions, such as those under about 5–10 minutes. The timer 27 may also be used to determine the elapsed or duration of the power disruption. The monitor 26 and timer 27 may be at least partially integrated into a single circuit. The battery 30 can be configured to power the speaker 28, timer 27, and/or visual alert 15 when a power disruption occurs. The battery 30 can be any suitable power source such as conventional AAA, AA, or button type batteries, or other suitable battery types. The battery 30 can be releasebly mounted to and/or in the device housing 10h. The device 10 can include a battery mounting receiving space that is configured to releasably hold the battery and typically is configured to be easily accessible by a user.

The device 10 can include a timer (27, FIG. 4) that may be configured to provide a cumulative power outage duration time over a desired monitoring interval. The monitoring interval can be triggered by an initial event and then the cumulative outage duration time can include all events occurring within 24 hours of the first determined event. For example, if the power is disrupted for 30 minutes, goes back on for five minutes and then is disrupted again for 2 hours, the timer may be configured to indicate 2 hours and 30 minutes. The timer may incrementally advance to indicate the cumulative power outage duration over the 24 hour (or other) period.

In particular embodiments, the device 10 can be configured as a single-use disposable device. That is, after a power disruption is detected and an audible alert generated in response thereto, certain components of the device circuitry may be impaired or destroyed. A modular replacement kit of selected circuit components can be configured to releasably mount in and/or to the housing and/or the entire device 10 may be disposed after a single event. In other embodiments, the device is reusable and functional for a plurality of alarms (typically with a replaceable battery source).

As noted above, the battery 30 may be releasably mounted in the device 10 to allow for use in a subsequent device and/or to allow for replacement when it reaches a low power state. In other embodiments, a rechargeable battery, such as a trickle charge battery, may be used to provide power to generate the alert(s) when a power outage occurs. The battery 30 can be rechargeable by the power supplied from the electrical socket/outlet. The device 10 may include a low-battery audible and/or visual alert. The device 10 may also be configured to generate a low battery output warning via the speaker 28 and/or visual alert 15. The low battery warning can be different in appearance and/or sound from the power failure/disruption alert. For example, the device 10 may use a chirping signal to indicate a low battery state.

Figure 5:
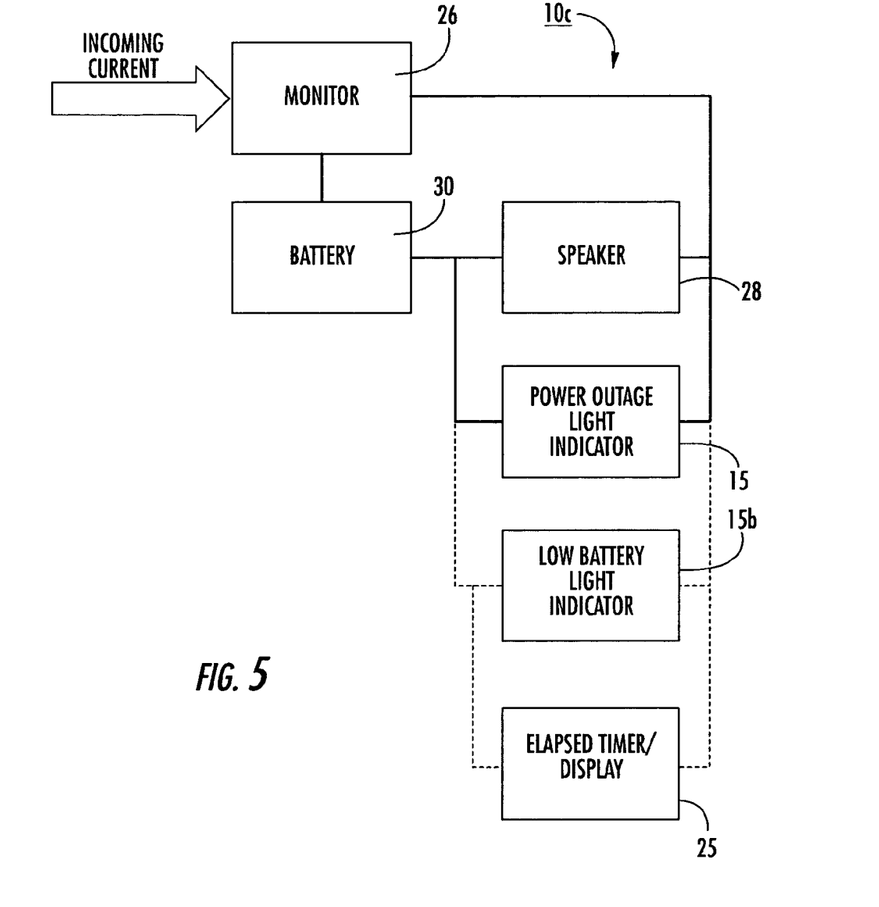
FIG. 5 is a block diagram of a power disruption alert device according to embodiments of the present invention.

As shown in FIG. 5, the device 10 may optionally include a low battery light indicator 15b (typically an LED configured, for example to output a (flashing) yellow light) as well as a power outage light indicator 15 (also typically an LED providing a different color light such as a red light). The device 10 can also optionally include the elapsed timer and display 25.

Figure 6:
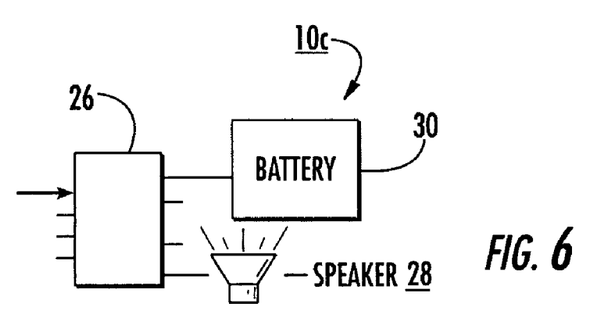
FIG. 6 is a circuit diagram of a power disruption alert device according to embodiments of the present invention.
Figure 7:
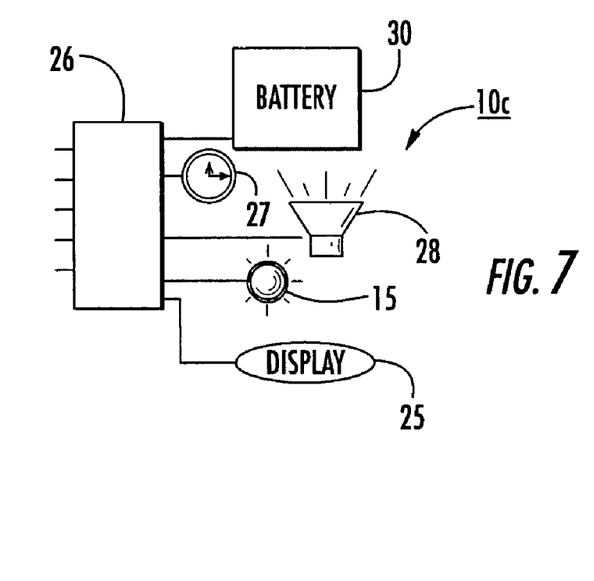
FIG. 7 is a circuit diagram of a power disruption alert device according to embodiments of the present invention.

FIGS. 6 and 7 illustrate that the device 10 can include an electronic circuit 10c that includes a processor (such as a micro or nano processor). Thus, the monitor 26 can be the processor 26p or another component in communication therewith. The processor 26p can be in communication with the timer or clock 27 and direct the activation of the audible alert 10s through the speaker 28 and/or the visual alert 10v by activating the visual alert device 15. Similarly, the processor 26p can delay the activation of the alert for short power disruptions using clock/timer 27. The same clock/timer 27 can be used to provide the elapsed time output to the display 25. The timer 27 can be integrated into the processor 26p. The circuit 10c can be configured to be substantially inoperative when power is detected and to operate (after a suitable delay) when power is disrupted.

Figure 8A:
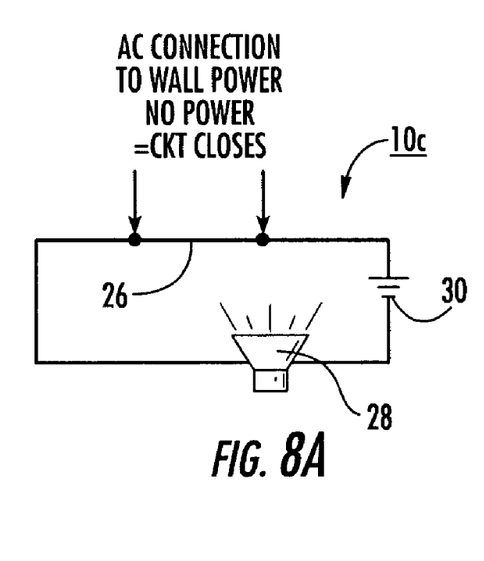
FIGS. 8A and 8B are circuit diagrams on an exemplary power disruption alert circuit, with FIG. 8A illustrating power out and FIG. 8B illustrating the circuit when power is on, according to embodiments of the present invention.
Figure 8B:
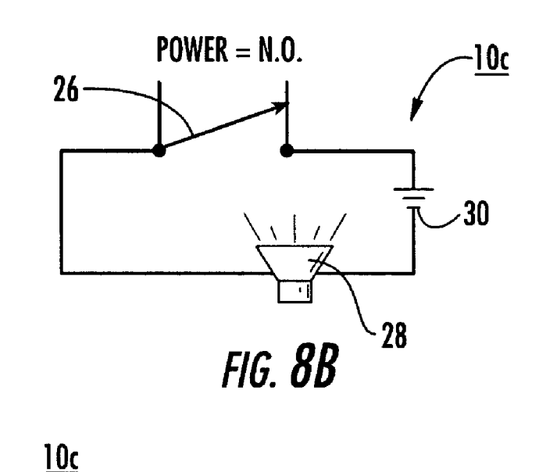
Figure 9:
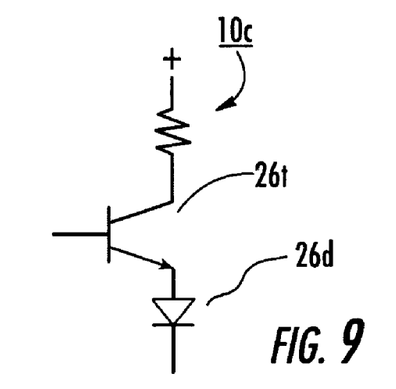
FIG. 9 is a partial circuit schematic of an exemplary alternate power disruption monitoring circuit employing a transistor according to embodiments of the present invention.

FIGS. 8A and 8B illustrate a high order schematic example of an electronic circuit 10c having a normally open monitor 26 configuration. FIG. 8B illustrates that the battery 30 does not power the speaker 28 until the power to the electrical outlet is disrupted, closing the circuit 26 and connecting the battery 30 to the speaker thereby generating the audible alert. Thus, the monitor 26 can comprise an electronic component and/or switch that reacts to power taken away from the wall electrical outlet. Other circuit configurations may also be used as is well known to those of skill in the art. FIG. 9 illustrates that the circuit 10c may include a transistor 26t and diode 26d that can be in communication with the electrical outlet and form a portion of the monitor 26 that switches and/or activates the audible alert in response to a power outage.

The speaker 28 can be configured to transmit a prerecorded text message held in memory associated therewith or other desired auditory signal. It is noted that the term "speaker" is used herein includes any audible output device such as a buzzer, chime, voice message and the like. The pre-recorded message (such as "Alert, Power Outage") may be held in the processor 26p for the embodiments having a processor with imbedded memory. The device 10 may include a series of pre-recorded messages such as "Alert, Low Battery"; "Alert, Power Outage"; and "Alert, Long Power Outage". The latter message may be used when a power outage has been detected for a certain period without user acknowledgement to clear the alert. The messages may be interspersed with siren or other loud signals for increased impact and noise.

The audible message and/or alert may be output intermittently with serially increasing delays to prolong battery life and provide messages over a longer time period. For example, the alert may be substantially constant for the first 5 minutes and then generated every 15 minutes for the next hour and then once every hour thereafter. So, for example, if power is disrupted in the middle of the night, when a user is less likely to hear the alert, the battery life may be less likely to be depleted by reducing the frequency that the alert is generated.

In particular embodiments, the device 10 is a low-cost device providing an economic way for residential consumers to monitor home outlets and a user can use a plurality of the devices 10 in different electrical outlets in his/her home.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A self-contained power disruption alert device, comprising:

a housing with a plurality of male conductors extending outwardly therefrom, the male conductors sized and configured to enter an electrical wall outlet to be in electrical communication therewith wherein the housing has a forward surface with a height and width defining a surface area that is less than about 14 in², wherein the housing is compactly configured with bounds thereof being substantially coextensive with a portion of an electrical socket cover plate to allow visual access to a ground fault interruption (GFI) reset on the electrical socket cover plate and wherein the device has a weight that is self-supported upon plug into an electrical socket in the electrical socket cover plate;

an electronic circuit in the housing and configured to respond to a power disruption in the electrical wall outlet;

a battery receiving space disposed on and/or in the housing and sized and configured to hold a battery to be in electrical communication with the electronic circuit to power the electronic circuit; and a speaker in communication with the electronic circuit, wherein, in operation, an audible alert is output by the speaker when power to the electrical wall outlet is disrupted, and wherein the device is self-contained, wherein the device is a single-use device that is disposable after a single power disruption.

2. A power disruption alert device according to claim 1, in combination with a releaseably mountable battery positioned in the battery receiving space in electrical communication with the electronic circuit to power the electronic circuit when power to the electrical wall outlet is disrupted.

3. A power disruption alert device according to claim 1, wherein the housing is configured to be portable and useable in different wall outlets as desired by a user.

4. A power disruption alert device according to claim 1, wherein the device is devoid of externally extending wires and wireless signal transmitters and generates the audible alert signal only locally.

5. A power disruption alert device according to claim 1, further comprising a female electrical outlet disposed on the housing, the female electrical outlet sized and configured to receive male conductors therein and electrically connect the male conductors to the wall electrical outlet.

6. A power disruption alert device according to claim 1, further comprising a timer in communication with the electronic circuit configured for determining a duration of the power disruption.

7. A power disruption alert device according to claim 6, further comprising an externally viewable display for providing a numerical value of the duration of the power disruption.

8. A power disruption alert device according to claim 7, wherein the display is a digital display configured to output a time measure of the power disruption duration in hours and minutes.

9. A power disruption alert device according to claim 7, wherein the display is a digital display configured to output the power disruption duration in days, hours and minutes.

10. A power disruption alert device according to claim 1, further comprising a visual alert device in communication with the electronic circuit and positioned on the housing so as to be externally visible during operation, the visual alert is configured to visually indicate when a power disruption occurs.

11. A power disruption alert device according to claim 1, wherein the visual alert device comprises a light emitting diode, and wherein the device is configured to delay generating the audible alert until power is disrupted for greater than a predetermined time.

12. A power disruption alert device according to claim 1, wherein the housing has a forward surface with a height and width, each being less than about 3 inches, and a depth of less than about 1 inch, and wherein the housing has a single electrical socket thereon, accessible on the forward surface thereof.

13. A power disruption alert device according to claim 1, wherein the device is configured to connect to a wall panel outlet in communication with a GFI circuit, and wherein the device is sized and configured to mount to the wall panel outlet to allow visual access to a manual GFI reset being substantially medially disposed on the panel outlet associated with the GFI circuit.

14. A device according to claim 1, wherein a component in the electronic circuit is impaired or destroyed after a power disruption.

15. A self-contained power disruption alert device, comprising:

a housing with a plurality of male conductors extending outwardly therefrom, the male conductors sized and configured to enter an electrical wall outlet to be in electrical communication therewith wherein the housing has a forward surface with a height and width defining a surface area that is less than about 14 in², wherein the housing is compactly configured with bounds thereof being substantially coextensive with a portion of an electrical socket cover plate to allow visual access to a ground fault interruption (GFI) reset on the electrical socket cover plate and wherein the device has a weight that is self-supported upon plug into an electrical socket in the electrical socket cover plate;

an electronic circuit in the housing and configured to respond to a power disruption in the electrical wall outlet, wherein the electronic circuit comprises at least one pre-recorded message;

a battery receiving space disposed on and/or in the housing and sized and configured to hold a battery to be in electrical communication with the electronic circuit to power the electronic circuit; and a speaker in communication with the electronic circuit, wherein, in operation, the speaker is configured to output the pre-recorded voice message as an alert when power to the electrical wall outlet is disrupted.

16. A power disruption alert device according to claim 15, further comprising a manual externally accessible reset configured to allow a user to clear a timer and/or display for a subsequent power disruption.

17. A power disruption alert device according to claim 16, wherein the electronic circuit comprises a processor that provides the timer that is in communication with the display.

18. A power disruption alert device according to claim 15, wherein the electronic circuit comprises a microprocessor configured with electronic memory having the at least one prerecorded message that is configured to be transmitted during a power disruption.

19. A device according to claim 18, wherein the at least one pre-recorded message is a plurality of different pre-recorded messages, at least one for alerting of a power outage and another at least one alerting of a low battery condition.

20. A device according to claim 18, wherein the at least one pre-recorded message is a plurality of different pre-recorded messages including a message for longer power outages that is different from the message for a shorter power outage.

21. A device according to claim 18, wherein the at least one message is interspersed with loud audible signals thereby providing increased impact and noise alerts.

22. A self-contained power disruption alert device, comprising:
   a housing with a plurality of male conductors extending outwardly therefrom, the male conductors sized and configured to enter an electrical wall outlet to be in electrical communication therewith;
   an electronic circuit in the housing and configured to respond to a power disruption in the electrical wall outlet a timer in communication with the electrical circuit configured for determining a duration of the power disruption;
   a battery receiving space disposed on and/or in the housing and sized and configured to hold a battery to be in electrical communication with the electronic circuit to power the electronic circuit; and
   a speaker in communication with the electronic circuit, wherein, in operation, an audible alert is output by the speaker when power to the electrical wall outlet is disrupted,
   wherein the device is self-contained, wherein the housing has a forward surface with a height and width defining a surface area that is less than about 14 in$^2$, wherein the housing is compactly configured with bounds thereof being substantially coextensive with a portion of an electrical socket cover plate so as to allow external visual access to a GFI reset on the electrical socket cover plate, wherein the device has a weight that is self-supported upon plug into an electrical socket in the electrical socket cover plate, and wherein the device without a battery weighs less than about 8 ounces.

23. A power disruption alert device according to claim 22, wherein the device comprises a single female electrical receptacle outlet, and wherein the device with a battery weighs less than about 8 ounces.

24. A method for generating an alert when power is disrupted to an electrical outlet, comprising:
   mounting a self-contained power disruption alert device to an electrical outlet wherein the mounting step is carried out by mounting the device to a wall outlet having ground fault interruption (GFI) circuit in a compact manner whereby the device occupied only a portion of a electrical outlet cover panel and allows visual access to a GFI reset on the cover panel, and the mounting step is further carried out by inserting male conductors into a female outlet in a dual outlet wall cover panel, wherein the alert device has a forward surface with a height and width, each being less than about 3 inches, and a depth that is less than about 1 inch, wherein the device provides a single female electrical receptacle and is substantially coextensive with a portion of the wall female electrical outlet cover panel, and wherein the alert device without a battery weighs less than about 8 ounces;
   electronically selecting a pre-recorded voice message from one of a plurality of pre-recorded voice messages stored in the device; and
   automatically transmitting the selected pre-recorded voice message when power to the electrical outlet is disrupted.

25. A method according to claim 24, further comprising determining the time duration of the power disruption and displaying the determined time duration.

26. A method according to claim 25, further comprising resetting a timer and/or clearing a display.

27. A method according to claim 24, further comprising generating a visual alert to visually indicate when a power disruption occurs.

28. A method according to claim 24, further comprising impairing operation of the electronic circuit alter a single power disruption occurs and the audible alert is generated to provide a single-use disposable power outage alert device.

29. A method according to claim 24, wherein the automatically generating an audible alert comprises delaying generating the alert until power is disrupted greater than a predetermined time duration.

30. A self-contained power disruption alert device, comprising:
   a housing with a plurality of male conductors extending outwardly therefrom, the male conductors sized and configured to enter an electrical wall outlet to be in electrical communication therewith wherein the housing has a forward surface with a height and width defining a surface area that is less than about 14 in$^2$, wherein the housing is compactly configured with bounds thereof being substantially coextensive with a portion of an electrical socket cover plate to allow visual access to a ground fault interruption (GFI) reset on the electrical socket cover plate and wherein the device has a weight that is self-supported upon plug into an electrical socket in the electrical socket cover plate;
   an electronic circuit in the housing and configured to respond to a power disruption in the electrical wall outlet;
   a battery receiving space disposed on and/or in the housing and sized and configured to hold a battery to be in electrical communication with the electronic circuit to power the electronic circuit, wherein the housing with the battery has a weight that is self-supported upon plug into the electrical outlet in the electrical socket plate;
   a speaker in communication with the electronic circuit, wherein, in operation, an audible alert is output by the speaker when power to the electrical wall outlet is disrupted; and
   a timer in communication with the electronic circuit, wherein the electronic circuit is configured to prevent transmission of the audible alert for minor power disruptions lasting less than about 5 minutes.

31. A self-contained power disruption alert device, comprising:
   a housing with a plurality of male conductors extending outwardly therefrom, the male conductors sized and configured to enter an electrical wall outlet to be in electrical communication therewith;
   an electronic circuit in the housing and configured to respond to a power disruption in the electrical wall outlet;
   a battery receiving space disposed on and/or in the housing and sized and configured to hold a battery to be in electrical communication with the electronic circuit to power the electronic circuit;
   a speaker in communication with the electronic circuit, wherein, in operation, an audible alert is output by the speaker when power to the electrical wall outlet is disrupted;
   electronic memory in communication with the electronic circuit configured to store different power outage durations occurring over a desired interval; and
   a user input button in communication with the electronic memory that allows a user to prompt the device for the outage duration/length of each detected outage event, wherein the device is compactly configured with bounds thereof being substantially coextensive with a portion of an electrical socket cover plate so as to allow external visual access to a GFI reset on the electrical socket cover plate, wherein the device has a weight that is self-supported upon plug into an electrical socket in the electrical socket cover plate.

32. A device according to claim 31, further comprising a visual alert in communication with the electronic circuit and held by the housing so that the visual alert is externally visible may be configured to present a different visual appearance when more than one event is detected and not cleared from the device's electronic memory, and wherein the device comprises a single female electrical receptacle outlet.

\* \* \* \* \*